US010218801B2

(12) United States Patent
Matsumura

(10) Patent No.: US 10,218,801 B2
(45) Date of Patent: Feb. 26, 2019

(54) INFORMATION DEVICE IDENTIFICATION SYSTEM, INFORMATION DEVICE IDENTIFICATION METHOD, INFORMATION DEVICE, NON-TRANSITORY COMPUTER READABLE RECORDING MEDIUM FOR USE IN A COMPUTER WHICH CAN ASSOCIATE IDENTICAL USERS WITH EACH OTHER

(71) Applicant: PANASONIC INTELLECTUAL PROPERTY MANAGEMENT CO., LTD., Osaka (JP)

(72) Inventor: Sowyo Matsumura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 202 days.

(21) Appl. No.: 15/261,506

(22) Filed: Sep. 9, 2016

(65) Prior Publication Data

US 2016/0381161 A1 Dec. 29, 2016

Related U.S. Application Data

(63) Continuation of application No. PCT/JP2014/004105, filed on Aug. 6, 2014.

(30) Foreign Application Priority Data

Mar. 13, 2014 (JP) .................................. 2014-049949

(51) Int. Cl.
*H04L 29/08* (2006.01)
*H04L 29/12* (2006.01)
(Continued)

(52) U.S. Cl.
CPC ......... *H04L 67/22* (2013.01); *G06Q 30/0201* (2013.01); *G06Q 30/0241* (2013.01);
(Continued)

(58) Field of Classification Search
CPC ......... H04L 29/06027; H04L 29/12009; H04L 29/12047; H04L 61/15; H04L 61/1511;
(Continued)

(56) References Cited

U.S. PATENT DOCUMENTS 5,854,901 A * 12/1998 Cole ................. H04L 29/12018
709/245
7,761,594 B1 * 7/2010 Mowat ................ H04L 67/2814
709/223
(Continued)

FOREIGN PATENT DOCUMENTS

JP 2002-074153 A 3/2002
JP 2002-117321 A 4/2002
(Continued)

OTHER PUBLICATIONS

International Search Report and Written Opinion issued in International Patent Application No. PCT/JP2014/004105, dated Nov. 11, 2014; with partial English translation.

*Primary Examiner* — Alina A Boutah
(74) *Attorney, Agent, or Firm* — McDermott Will & Emery LLP

(57) ABSTRACT

An information device identification system includes: a remote host holding unit that holds a specific remote host name; a receiving unit that receives an inquiry about an internet protocol (IP) address corresponding to one remote host name; a determining unit that determines whether or not the one remote host name received by the receiving unit matches the specific remote host name held by the remote host holding unit; an IP address responding unit that responds by transmitting, to a device, an IP address of an information device instead of the IP address indicating one remote host when the determining unit determines that the one remote host name matches the specific remote host name; and a device ID responding unit that responds by transmitting, to the device, data including information for instructing the device to connect to a predetermined redirect destination and specific information for uniquely identifying the information device.

9 Claims, 17 Drawing Sheets

(51) Int. Cl.
*H04L 12/64* (2006.01)
*G06Q 30/02* (2012.01)

(52) U.S. Cl.
CPC ..... *G06Q 30/0255* (2013.01); *G06Q 30/0277* (2013.01); *H04L 12/6418* (2013.01); *H04L 61/1511* (2013.01); *H04L 61/2007* (2013.01); *H04L 61/301* (2013.01); *H04L 67/02* (2013.01); *H04L 67/146* (2013.01); *H04L 67/306* (2013.01)

(58) Field of Classification Search
CPC ............... H04L 61/2007; H04L 61/301; H04L 12/6418; G06Q 30/0201; G06Q 30/0241; G06Q 30/0255; G06Q 30/0277; H04N 9/907; H04N 9/772; H04N 9/765; H04N 21/8153; H04N 21/6175; H04N 21/43632; H04N 21/4223; H04N 21/4184; H04N 21/4143; H04N 21/2743; H04N 67/02; H04N 67/146; H04N 67/22; H04N 67/306
See application file for complete search history.

(56) References Cited

U.S. PATENT DOCUMENTS

| | | | | |
|---|---|---|---|---|
| 7,899,932 | B2* | 3/2011 | Takeda | H04L 29/12066 709/230 |
| 8,295,268 | B2* | 10/2012 | Tanaka | H04L 29/06027 370/351 |
| 9,960,995 | B2* | 5/2018 | You | H04L 45/54 |
| 2006/0265392 | A1 | 11/2006 | Sunada et al. | |
| 2007/0008974 | A1* | 1/2007 | Dispensa | H04L 12/5692 370/392 |
| 2007/0174423 | A1* | 7/2007 | Yoshida | H04L 67/2814 709/217 |
| 2008/0259906 | A1* | 10/2008 | Shkedi | G06Q 30/0241 370/352 |
| 2009/0049468 | A1 | 2/2009 | Shkedi | |
| 2009/0059945 | A1* | 3/2009 | Yokomitsu | H04L 29/06027 370/419 |
| 2009/0064291 | A1* | 3/2009 | Wahl | H04L 63/0815 726/5 |
| 2009/0172728 | A1 | 7/2009 | Shkedi et al. | |
| 2010/0008363 | A1* | 1/2010 | Ee | H04L 43/50 370/392 |
| 2010/0325659 | A1 | 12/2010 | Shkedi | |
| 2011/0067070 | A1* | 3/2011 | Choi | H04N 21/4782 725/59 |
| 2011/0099576 | A1 | 4/2011 | Shkedi et al. | |
| 2011/0196945 | A1* | 8/2011 | Alkhatib | H04L 29/12066 709/220 |
| 2012/0047530 | A1 | 2/2012 | Shkedi | |
| 2012/0084801 | A1 | 4/2012 | Rowe et al. | |
| 2012/0084828 | A1* | 4/2012 | Rowe | H04N 21/252 725/110 |
| 2012/0096491 | A1* | 4/2012 | Shkedi | H04N 21/4532 725/35 |
| 2014/0082664 | A1 | 3/2014 | Shkedi et al. | |
| 2014/0223476 | A1 | 8/2014 | Shkedi | |
| 2015/0095502 | A1* | 4/2015 | Le Bolzer | H04L 45/24 709/227 |
| 2015/0124817 | A1* | 5/2015 | Merchant | H04L 45/74 370/392 |

FOREIGN PATENT DOCUMENTS

| | | |
|---|---|---|
| JP | 2005-173865 A | 6/2005 |
| JP | 2006-323721 A | 11/2006 |
| JP | 2010-527524 A | 8/2010 |
| JP | 2011-513803 A | 4/2011 |
| JP | 2012-068828 A | 4/2012 |
| JP | 2012-133780 A | 7/2012 |
| JP | 2012-141658 A | 7/2012 |
| JP | 2013-077181 A | 4/2013 |
| JP | 2013-543710 A | 12/2013 |
| WO | 2008/130736 A1 | 10/2008 |
| WO | 2009/088554 A2 | 7/2009 |
| WO | 2012/047853 A1 | 4/2012 |

* cited by examiner

INFORMATION DEVICE IDENTIFICATION SYSTEM, INFORMATION DEVICE IDENTIFICATION METHOD, INFORMATION DEVICE, NON-TRANSITORY COMPUTER READABLE RECORDING MEDIUM FOR USE IN A COMPUTER WHICH CAN ASSOCIATE IDENTICAL USERS WITH EACH OTHER

CROSS REFERENCE TO RELATED APPLICATIONS

This is a continuation application of PCT International Application No. PCT/JP2014/004105 filed on Aug. 6, 2014, designating the United States of America, which is based on and claims priority of Japanese Patent Application No. 2014-049949 filed on Mar. 13, 2014. The entire disclosures of the above-identified applications, including the specifications, drawings and claims are incorporated herein by reference in their entirety.

FIELD

The present disclosure relates to an information device identification system, an information device identification method, an information device, and a program.

BACKGROUND

Web advertisers perform targeting with the aim of presenting users who have accessed their webpages with information such as targeted advertisements which are suited to interests and choices of the users. The Web advertisers track a user by using an ID called an HTTP cookie issued to a browser, and creates a profile related to data on interests and choices of the user.

Recently, there has been a demand for more data on interests and choices of a user to be collected in order to present more appropriate information to the user. It is, however, not easy to know whether or not a user whose data on interests and choices are collected on a certain webpage and a user whose data on interests and choices are collected on another webpage are identical.

In light of this, for example, Patent Literature (PTL) 1 proposes a technique of collecting records of actions taken by a user on a first medium and associating identical users on the basis of user identification information specified upon logging in to a second medium.

CITATION LIST

Patent Literature

[PTL 1] Japanese Unexamined Patent Application Publication No. 2012-133780

SUMMARY

Technical Problem

An object of the present disclosure is to provide an information device identification system, an information device identification method, an information device, and a program which can associate identical users with each other without requiring users to perform an additional operation such as logging in.

Solution to Problem

An information device identification system according to an aspect of the present disclosure includes: a remote host holding unit configured to hold a specific remote host name indicating a predetermined remote host; a receiving unit configured to receive an inquiry about an internet protocol (IP) address corresponding to one remote host name indicating one remote host, the IP address being used by a device to connect to the one remote host; a determining unit configured to determine whether or not the one remote host name received by the receiving unit matches the specific remote host name held by the remote host holding unit; an IP address responding unit configured to respond by transmitting, to the device, an IP address of an information device instead of the IP address indicating the one remote host when the determining unit determines that the one remote host name matches the specific remote host name; and a device ID responding unit configured to, when the device is caused to send a request for data to the one remote host using the IP address of the information device transmitted by the IP address responding unit, respond by transmitting, to the device, data including information for instructing the device to connect to a predetermined redirect destination and specific information (device ID) for uniquely identifying the information device.

Advantageous Effects

According to the present disclosure, it is possible to provide an information device identification system, an information device identification method, an information device, and a program which can associate identical users with each other without requiring users to perform an additional operation such as logging in.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS (Underlying Knowledge Forming the Basis of the Present Disclosure)

Figure 1:
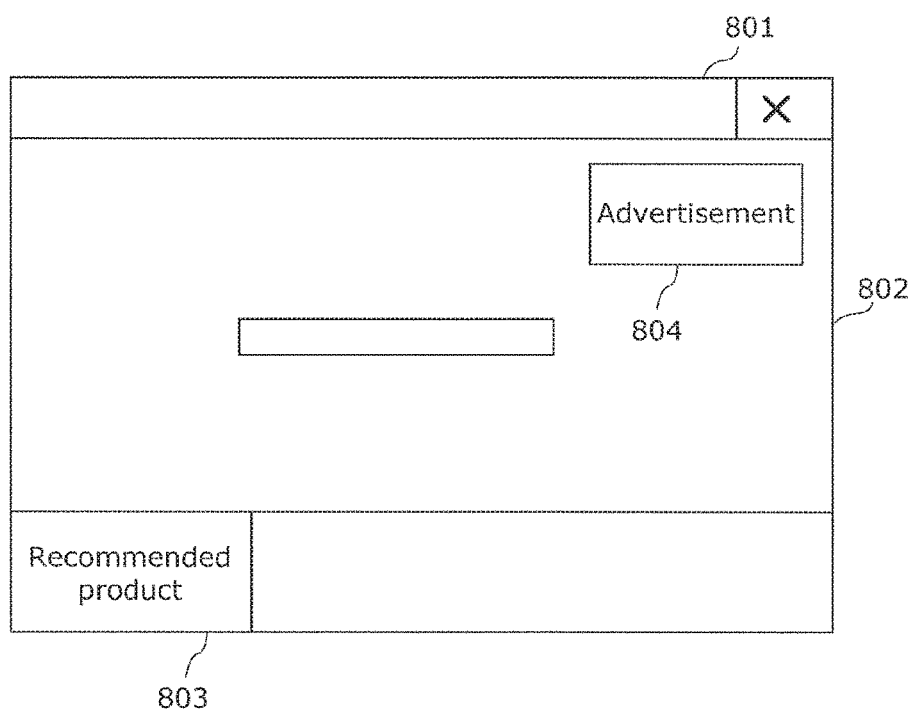
FIG. 1 illustrates targeting information being presented on a browser which a user views.

FIG. 1 illustrates targeting information being presented on a browser which a user views.

A user activates a browser 801 on a user terminal, such as a personal computer (PC), which the user uses, for example. Then, for example, a recommended product is presented in a region 803 of the browser 801, different from a region 802 of the browser 801 in which content accessed by the user is displayed, and an advertisement is presented in a region 804 of the browser 801. The advertisement presented in the region 804 is a targeted advertisement suited to interests and choices of the user, presented by a Web advertiser, etc. The Web advertiser tracks a user by using an ID called an HTTP cookie issued to a browser, and creates a profile related to data on interests and choices of the user. By using the created profile, the Web advertiser then presents the targeted advertisement suited to interests and choices of the user.

Figure 2:
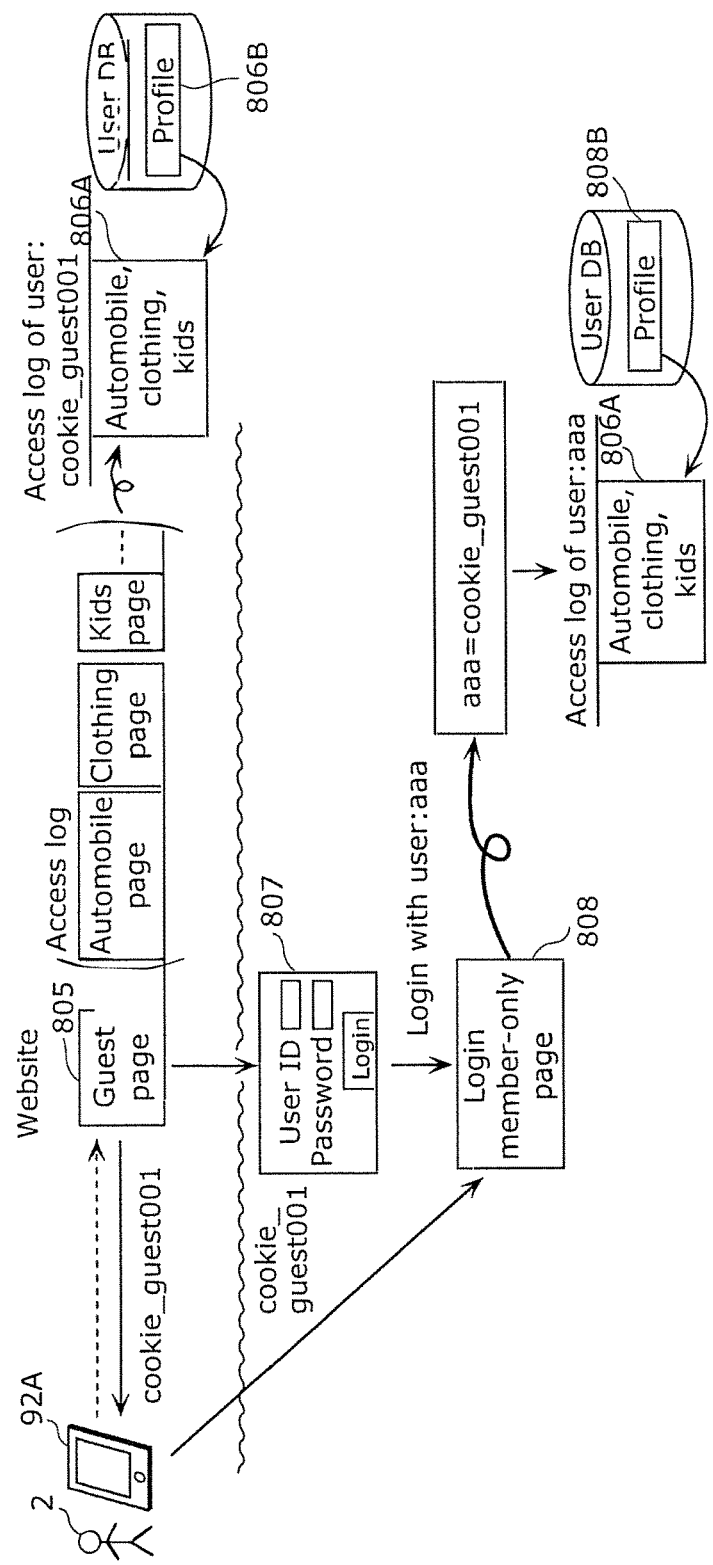
FIG. 2 illustrates a related art in which identical users using different media are associated with each other.

FIG. 2 illustrates a related art in which identical users using different media are associated with each other.

First, assume that a user 2 accesses a guest page 805 of a website using a browser of a user terminal (a device) such as a smartphone 92A. Assume then that, for example, the user 2 accesses a page of the website about automobile, a page of the website about clothing, and a page of the website about kids and that an ID called an HTTP cookie issued to the browser is cookie_guest001. In this case, an access log 806A that collectively records accesses by the ID cookie_guest001 is stored in a user database (DB) as a profile 806B of the ID cookie_guest 001.

Next, the user 2 logs in by entering a user ID, for example, aaa, and a predetermined password on a login page 807 of this website, and a login member-only page 808 is displayed in the browser of the user terminal (the device). In this case, the user ID aaa specified upon logging in and the ID cookie_guest001 are associated with each other as identical users. With this, the access log 806A that collectively records accesses by the ID cookie_guest001 associated with the user ID aaa is stored in the user DB as a profile 808B of the user ID aaa.

In this way, identical users using different webpages (the guest page 805 and the login member-only page 808) corresponding to different media can be associated with each other.

Figure 3:
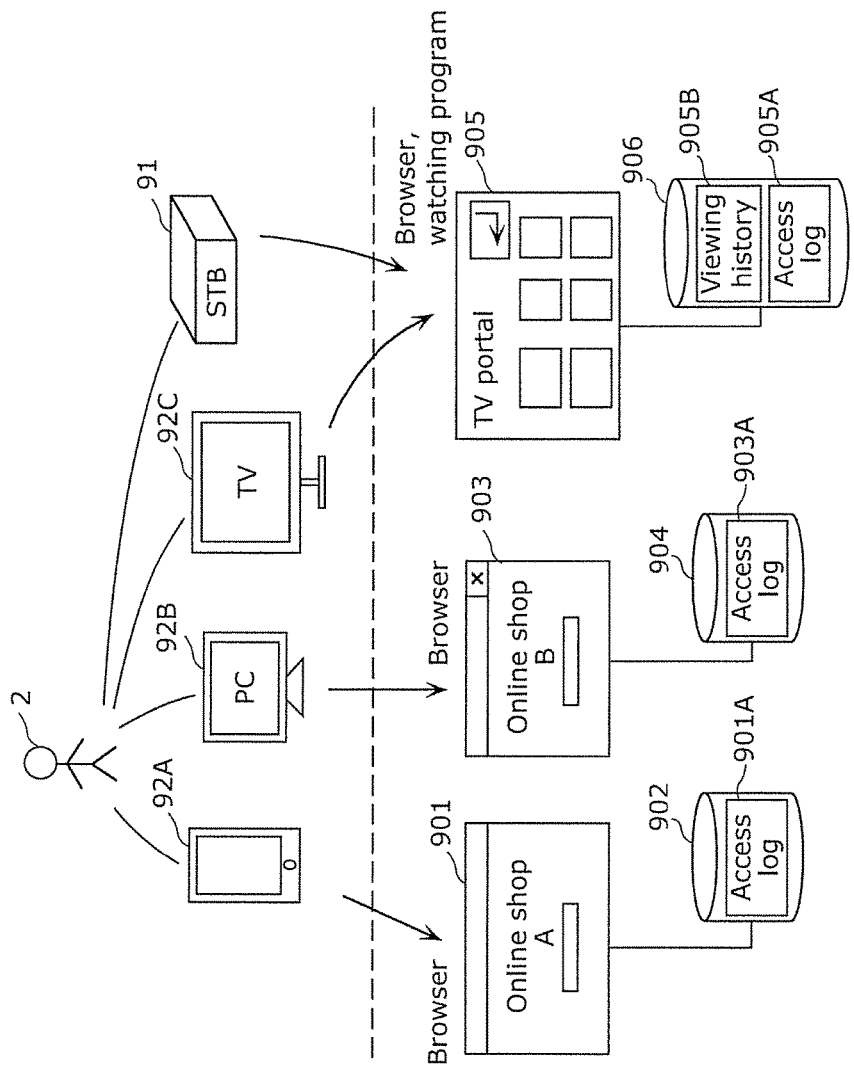
FIG. 3 illustrates a problem with the related art.

FIG. 3 illustrates a problem with the related art.

The user 2 can access a webpage using the device such as the smartphone 92A, a PC 92B, or a TV 92C which is a smart television which can access Web content. Furthermore, the user 2 can access a webpage or watch a provided program by using an information device such as a set top box (STB) 91.

In the case illustrated in FIG. 3, the user 2 accesses a website of an online shop A by using a browser 901 of the smartphone 92A, for example, to do shopping and so on. In this case, an access log 901A at the browser 901 is recorded in a user DB 902 of the online shop A. Furthermore, in the case where the user 2 accesses a website of an online shop B by using a browser 903 of the PC 92B, for example, to do shopping and so on, an access log 903A at the browser 903 is recorded in a user DB 904 of the online shop B.

Likewise, in the case where the user 2 accesses a webpage or watch a program on a TV portal 905 which is a portal screen of the TV 92C and the STB 91, an access log 905A or a viewing history 905B at the TV portal 905 is recorded in a user DB 906 of the TV portal 905.

However, whether or not the user 2 who accessed the online shop A and the user 2 who accessed the online shop B are identical is not known, that is, they cannot be linked to each other, in the method described with reference to FIG. 2. Likewise, whether or not the user 2 who accessed the online shop A and the user 2 who used the TV portal 905 are identical is not known, that is, they cannot be linked to each other, in the method described with reference to FIG. 2. Therefore, this requires the user 2 to perform an additional operation such as registering for associating identical users with each other.

The method described in PTL 1 includes the cases of using an IP address, a service user ID, a MAC address, and a resident registry number as identification information for associating identical users with each other. All these cases require users to perform an additional operation such as logging in.

As described above, the related art requires users to perform an additional operation such as logging in to associate identical users using different media with each other, which is troublesome for the users and is thus problematic.

If there is a need for a task (an additional operation) which users do not usually perform, it is highly unlikely that the users will perform the additional operation, meaning that it is reasonably possible that the percentage of users using different media being linked to each other will deteriorate. In this case, even when more data on interests and choices of users are collected, such data cannot be used. This means that in the case where a task (an additional operation) which users do not usually perform is required to link users using different media to each other, the problem of failing to present more appropriate information to the users arises as well.

Furthermore, in the case of using an IP address as the identification information for associating identical users with each other, there is a problem with the accuracy of linking of users using different media because the IP address easily varies. Furthermore, in the case of using a MAC address as the identification information for associating identical users with each other, there is the problem that information cannot be transmitted to an external web server via an ordinary browser.

Thus, an embodiment of the present invention is conceived in view of the aforementioned problem and has as an object to provide an information device identification system, an information device identification method, an information device, and a program which can associate identical users with each other without requiring users to perform an additional operation such as logging in.

Hereinafter, embodiments of the present invention will be described in detail with reference to the drawings appropriately. However, unnecessarily detailed descriptions may be omitted. For example, detailed description of well-known matter or repeated description of substantially the same elements may be omitted. This is to facilitate understanding for a person having ordinary skill in the art by avoiding unnecessary verbosity in the subsequent description.

Note that the accompanying drawings and the subsequent description are provided by the inventor to allow a person having ordinary skill in the art to sufficiently understand the present disclosure, and are thus not intended to limit the scope of the subject matter recited in the Claims.

Embodiment 1

[Overall Configuration]

Figure 4:
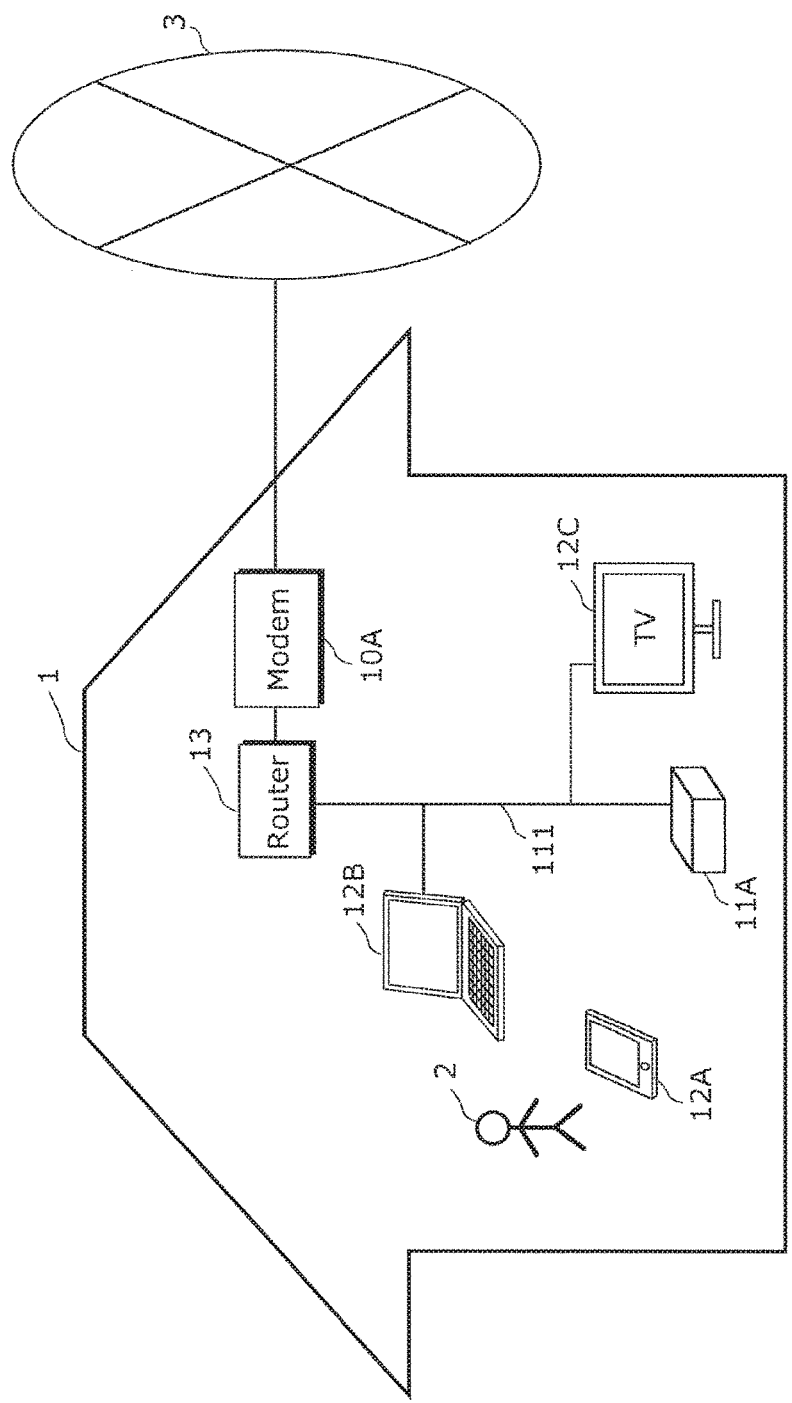
FIG. 4 illustrates an example of a schematic configuration of an information device identification system according to Embodiment 1.

FIG. 4 illustrates an example of a schematic configuration of an information device identification system according to Embodiment 1.

In a home 1 illustrated in FIG. 4, a STB 11A, which is an example of an information device 11, and a smartphone 12A, a PC 12B, and a TV 12C, which are an example of a device 12, are connected to a modem 10A, which is an example of a network information apparatus 10, via a router 13.

The modem 10A is an example of the network information apparatus 10 for connecting the information device 11 or the device 12 to, for example, a network outside the home 1, such as the Internet 3.

The information device identification system according to the present embodiment may include the network information apparatus and the information device 11 or may include the network information apparatus 10, the information device 11, and the device 12. The following will describe the case where the information device identification system includes the network information apparatus 10 and the information device 11.

[Configuration of Network Information Apparatus]

Next, the configuration of the network information apparatus 10 will be described.

Figure 5:
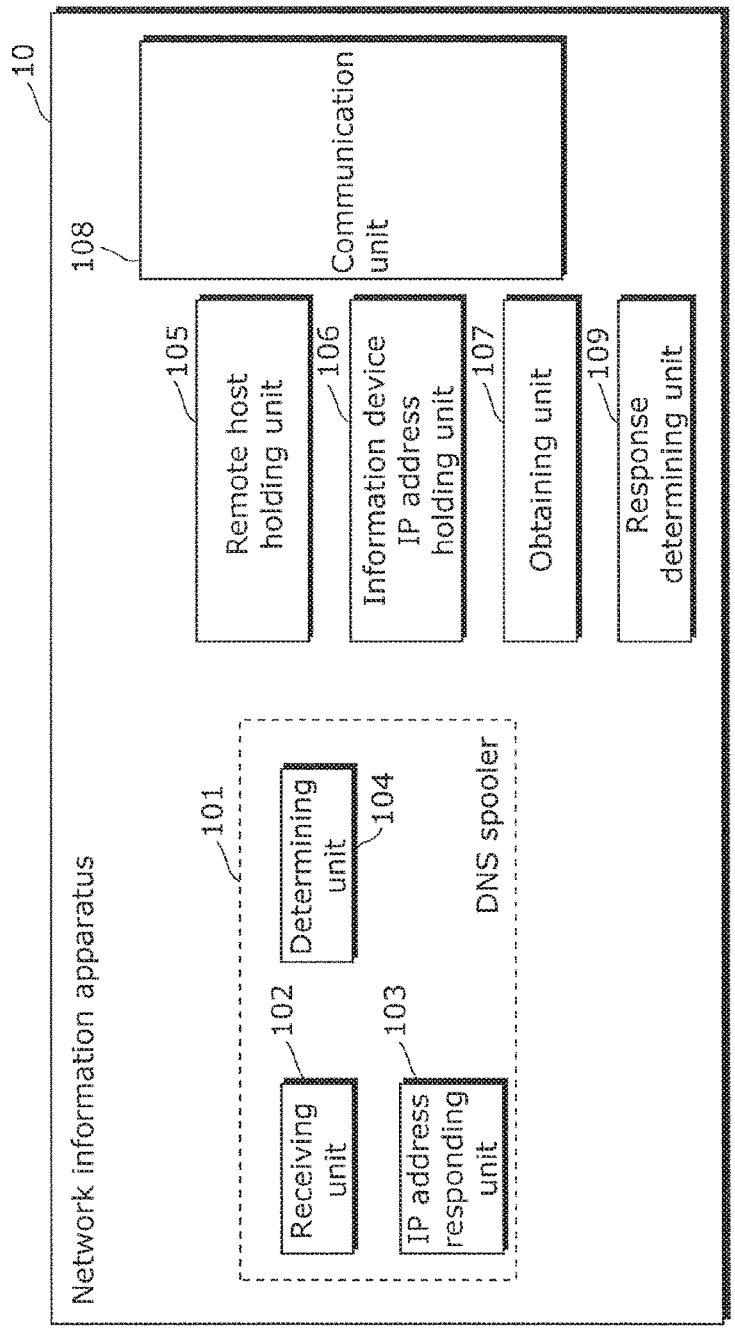
FIG. 5 is a block diagram illustrating an example of a configuration of a network information apparatus according to Embodiment 1.
Figure 6:
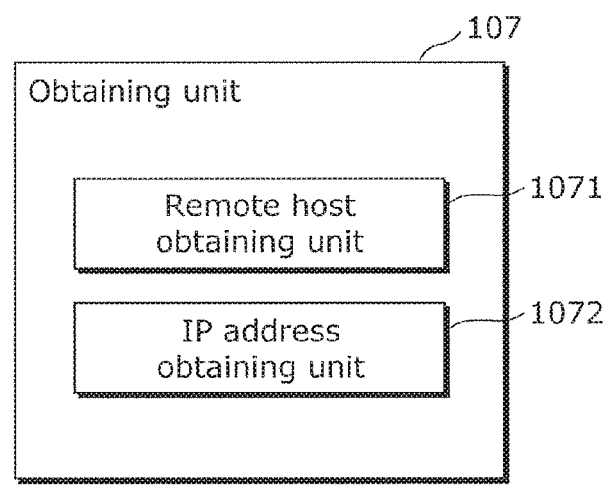
FIG. 6 is a block diagram illustrating an example of a detailed configuration of an obtaining unit illustrated in FIG. 5.

FIG. 5 is a block diagram illustrating an example of the configuration of the network information apparatus according to Embodiment 1. FIG. 6 is a block diagram illustrating an example of a detailed configuration of an obtaining unit illustrated in FIG. 5.

The network information apparatus 10 illustrated in FIG. 5 includes a DNS spooler 101, a remote host holding unit 105, an information device IP address holding unit 106, an obtaining unit 107, a communication unit 108, and a response determining unit 109.

The remote host holding unit 105 holds a specific remote host name indicating a predetermined remote host.

The DNS spooler 101 includes a receiving unit 102, an IP address responding unit 103, and a determining unit 104, and receives an inquiry about an internet protocol (IP) address corresponding to one remote host name and responds to the inquiry.

The receiving unit 102 receives the inquiry about the IP address which corresponds to the one remote host name indicating one remote host and is used by the device to connect to the one remote host.

The determining unit 104 determines whether or not the one remote host name received by the receiving unit 102 matches the specific remote host name held by the remote host holding unit 105.

The IP address responding unit 103 responds by transmitting, to the device 12, the IP address of the information device 11 instead of the IP address indicating the one remote host when the determining unit 104 determines that the one remote host name matches the specific remote host name. The IP address responding unit 103 responds by transmitting, to the device 12, the IP address indicating the one remote host when the determining unit 104 determines that the one remote host name does not match the specific remote host name.

The information device IP address holding unit 106 holds the IP address of the information device 11 obtained by the obtaining unit 107.

The obtaining unit 107 includes a remote host obtaining unit 1071 and an IP address obtaining unit 1072 as illustrated in FIG. 6. The remote host obtaining unit 1071 holds a specific remote host name indicating a predetermined remote host. The IP address obtaining unit 1072 obtains the IP address of the information device 11.

The communication unit 108 is connected to a network outside the home 1, such as the Internet 3, and communicates with a DNS server, a management server, and the like on the Internet 3. Furthermore, the communication unit 108 connects the information device 11 or the device 12 to the network outside the home 1, such as the Internet 3.

The response determining unit 109 determines whether or not a device ID responding unit 111 of the later-described information device 11 is ready to respond.

Specifically, when the response determining unit 109 determines that the device ID responding unit 111 is not ready to respond, the response determining unit 109 transmits the inquiry about the IP address corresponding to the one remote host name to a DNS server, which is external to the information device identification system, via the communication unit 108. When the response determining unit 109 determines that the device ID responding unit 111 is ready to respond, the response determining unit 109 transmits the inquiry about the IP address corresponding to the one remote host name to the DNS spooler 101 (the receiving unit 102).

For example, the response determining unit 109 may determine that the device ID responding unit 111 is not ready to respond when the information device 11 is OFF, and the response determining unit 109 may determine that the device ID responding unit 111 is ready to respond when the information device 11 is ON.

Note that the network information apparatus 10 need not include the information device IP address holding unit 106. In this case, the network information apparatus 10 may search a network to which the network information apparatus 10 is connected and obtain the IP address of the information device 11 before the IP address responding unit 103 responds by transmitting the IP address of the information device 11 to the device 12.

[Configuration of Information Device]

Next, the configuration of the information device 11 will be described.

Figure 7:
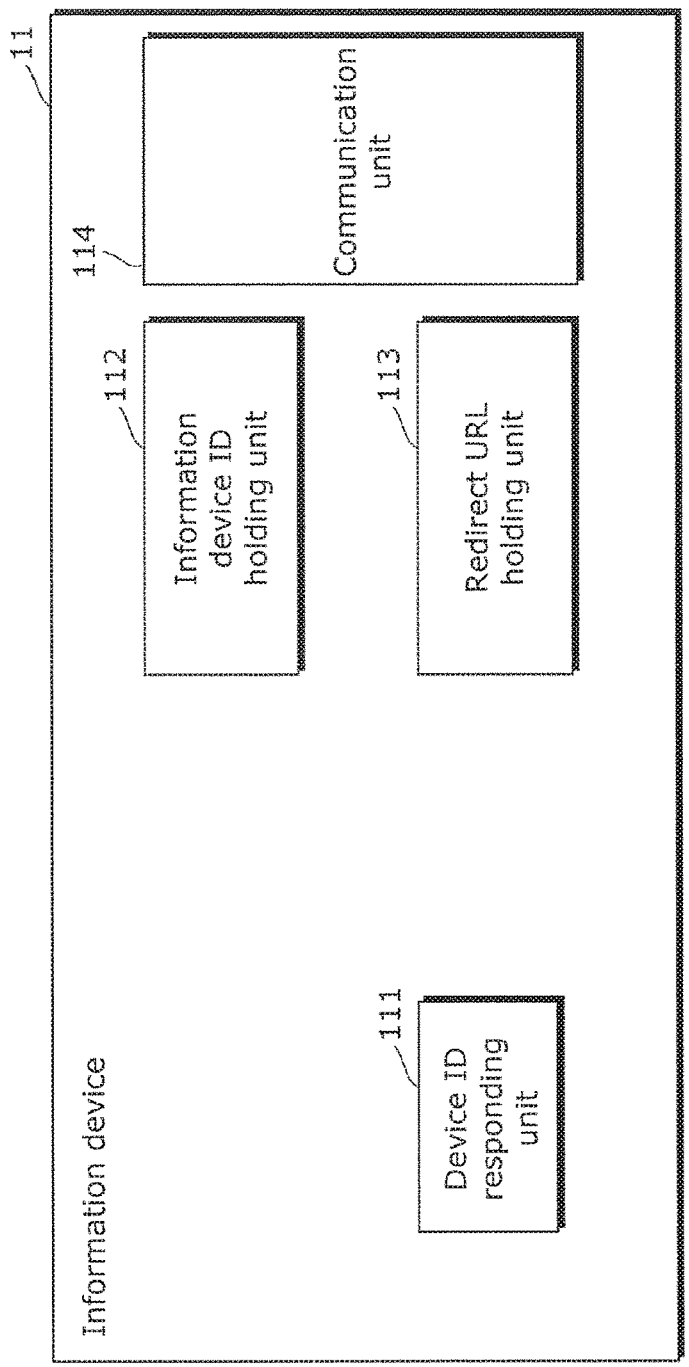
FIG. 7 is a block diagram illustrating an example of a configuration of an information device according to Embodiment 1.

FIG. 7 is a block diagram illustrating an example of the configuration of the information device according to Embodiment 1.

The information device 11 illustrated in FIG. 7 includes the device ID responding unit 111, an information device ID holding unit 112, a redirect URL holding unit 113, and a communication unit 114.

When the device 12 is caused to send a request for data to the one remote host using the IP address of the information device 11 transmitted by the IP address responding unit 103, the device ID responding unit 111 responds by transmitting, to the device 12, data including information for instructing the device 12 to connect to a predetermined redirect destination and specific information for uniquely identifying the information device 11 (a device ID).

The information device ID holding unit 112 holds the specific information for uniquely identifying the information device 11. The specific information herein is, for example, the ID of the information device 11 (the device ID).

The redirect URL holding unit 113 holds the URL of the predetermined redirect destination (also referred to as a redirect URL). Herein, "redirect" means the transfer from one URL to another URL on the web, and "redirect URL" means a forwarding URL on the web.

The communication unit 114 has a function of communicating with the information device 11 or the device 12. For example, the communication unit 114 connects the device ID responding unit 111 and the device 12 to each other when the device 12 accesses the IP address of the information device 11. Furthermore, the communication unit 114 regularly transmits the IP address of the information device 11 to the obtaining unit 107 of the network information apparatus 10 via the communication unit 108 thereof, and transmits the IP address of the information device 11 to the obtaining unit 107 in response to an inquiry (a search) from the obtaining unit 107, for example.

Note that the information device 11 need not include the redirect URL holding unit 113. In this case, the information device 11 may obtain the redirect URL by accessing a server, which is connected to an external network, via the communication unit 114 before the device ID responding unit 111 creates information for instructing the device 12 to connect to the predetermined redirect destination (at the time of creating a redirect transfer instruction).

[Communication Sequence of Information Device Identification System]

Next, the communication sequence of the information device identification system configured as described will be described.

Figure 8:
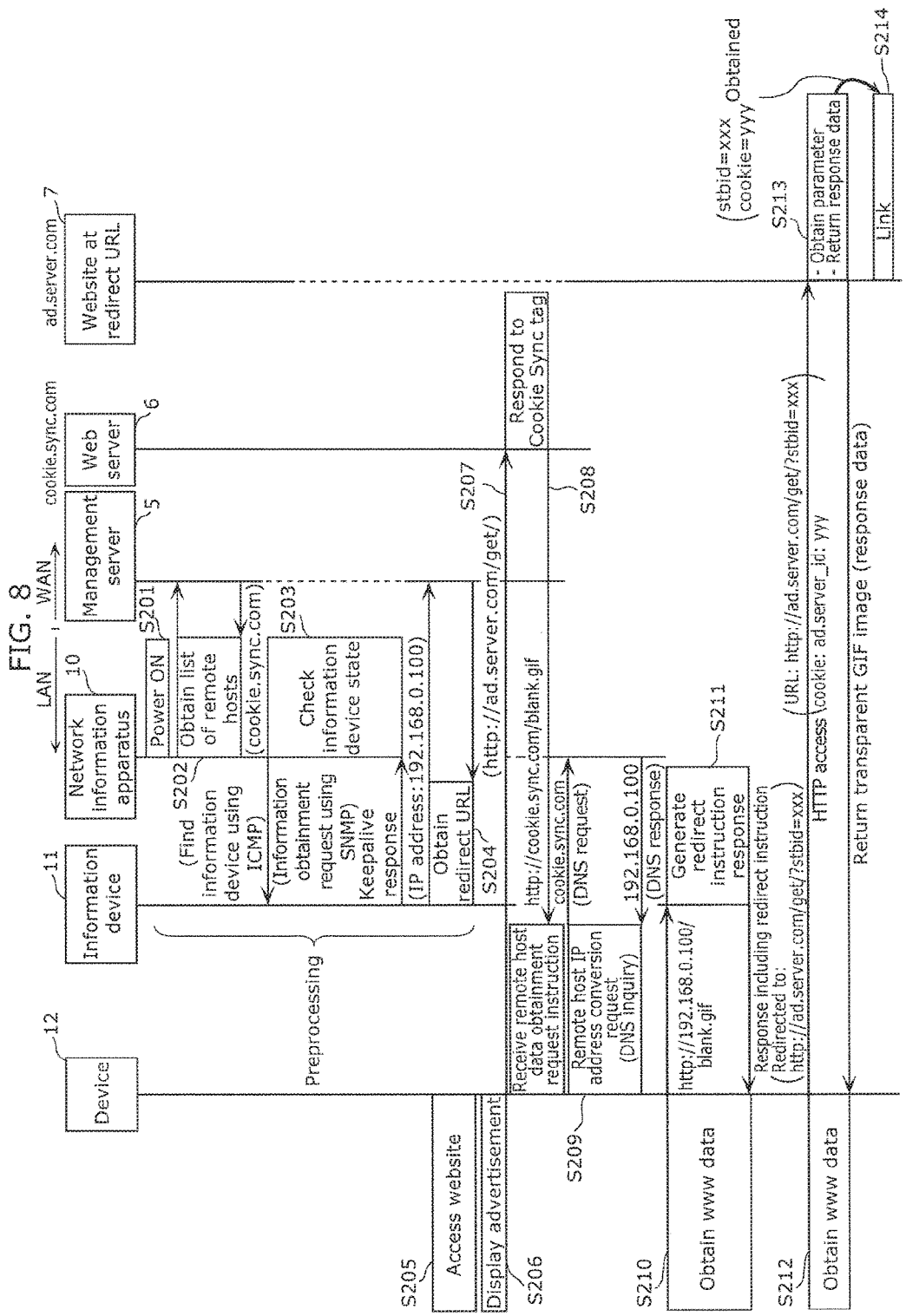
FIG. 8 illustrates an example of a communication sequence of an information device identification system according to Embodiment 1.
Figure 9:
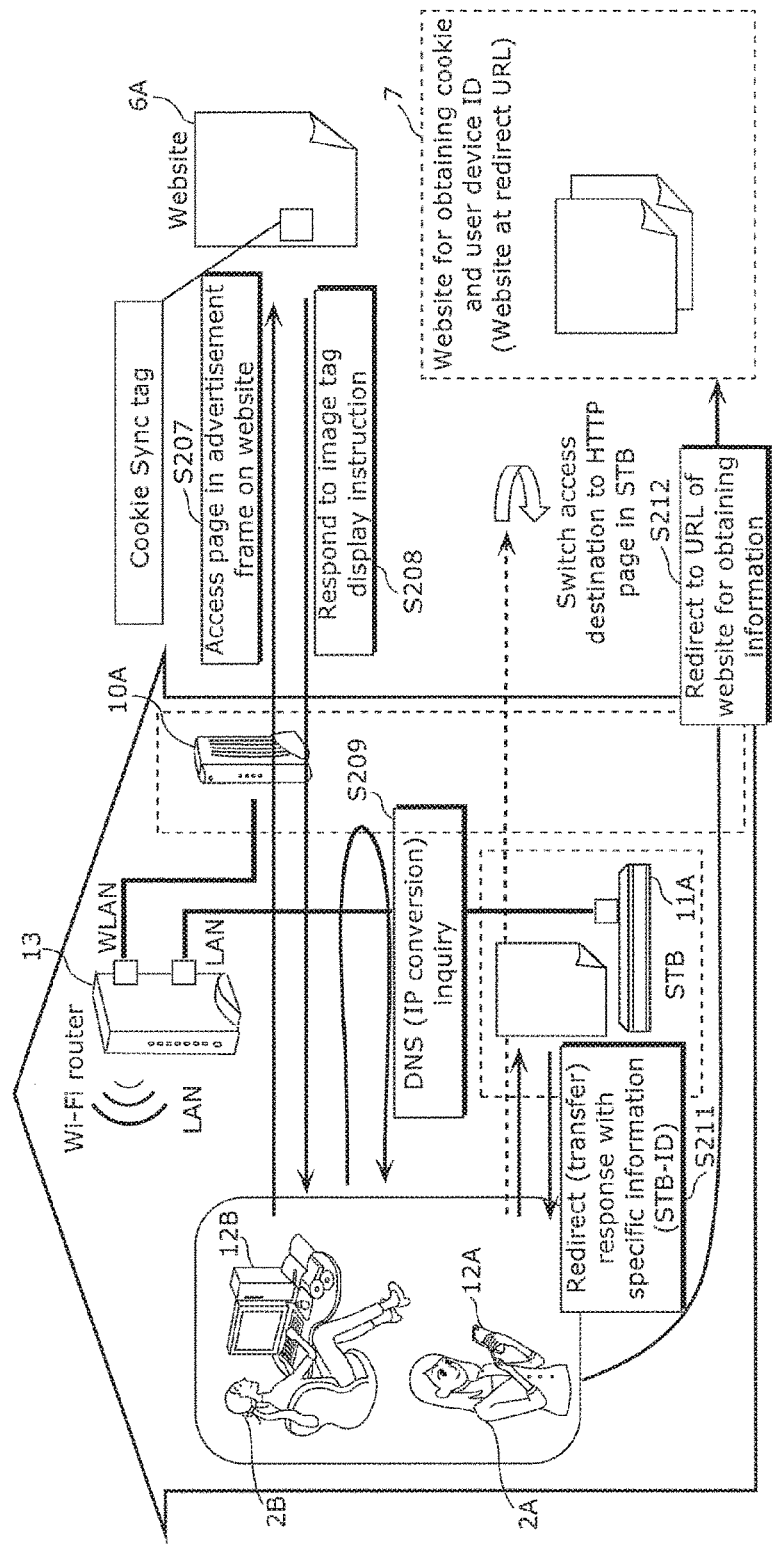
FIG. 9 is another illustration of the communication sequence illustrated in FIG. 8.

FIG. 8 illustrates an example of the communication sequence of the information device identification system according to Embodiment 1. FIG. 9 is another illustration of the communication sequence illustrated in FIG. 8. In FIG. 9, the information device 11 is exemplified as the STB 11A, and the device 12 and the user 2 are exemplified as a user 2A using the smartphone 12A and a user 2B using the PC 12B. Note that the same numerical reference is given to elements that are substantially the same as those in FIG. 8. FIG. 9 is another Illustration of FIG. 8, provided to allow for an intuitive understanding of FIG. 8.

The information device identification system according to Embodiment 1 performs preprocessing before the user 2 accesses a website by using the device 12 such as the smartphone 12A or the PC 12B. The preprocessing will be described below.

First, when the network information apparatus 10 is turned ON (S201), the network information apparatus 10 accesses the management server 5 connected to a wide network (for example, the Internet 3), which is external to a local network (LAN) to which the network information apparatus 10 belongs, and obtains a list (the latest list) of a specific remote host name indicating a predetermined remote host (S202). In the present embodiment, for example, cookie.sync.com is obtained as the specific remote host name indicating the predetermined remote host.

Next, the network information apparatus 10 checks the state of the information device 11 such as the STB 11A, for example (S203). In the present embodiment, the network information apparatus 10 finds the information device 11 using an internet control message protocol (ICMP) and sends an information obtainment request to the information device 11 using a simple network management protocol (SNMP). The information device 11 returns an IP address (for example, 192.168.0.100 in this case) to the network information apparatus 10 as a keepalive response when the device ID responding unit 111 is ready to respond, such as when the information device 11 is ON. In this manner, the network information apparatus 10 is capable of obtaining and storing the IP address of the information device 11.

The information device 11 then accesses the management server 5 via the network information apparatus 10 and obtains the predetermined redirect URL (S204). In the present embodiment, for example, URL "http://ad.server-.com/get/" is obtained as the predetermined redirect URL.

The following describes the case where the user 2 accesses a website by using the device 12, such as the smartphone 12A or the PC 12B, in the information device identification system that performed the preprocessing as described.

First, the user 2 accesses a website using, for example, the browser of the device 12 (S205).

The browser of the device 12 then displays an advertisement presented in an advertisement frame on the website, together with the accessed website (S206).

In the present embodiment, the browser of the device 12 accesses a web server 6 via the network information apparatus 10 and displays the advertisement presented in the advertisement frame on the website. In this advertisement frame, "Cookies sync tag" is embedded. Here, "Cookies sync tag" is a tag described in the hypertext markup language (HTML), which describes a website, to make a request for image data; this is the name of a tag that describes the URL of an image on a website in another domain for the purpose of providing the value of HTTP cookie to another domain.

Furthermore, when displaying the advertisement presented in the advertisement frame of the website, the browser of the device 12 accesses "Cookies sync tag" embedded in the advertisement frame (S207). The browser of the device 12 then receives a remote host data obtainment request instruction as a response from "Cookies sync tag," that is, as a response of an instruction for displaying an image tag designated by "Cookies sync tag" (S208). In the present embodiment, the browser of the device 12 receives an instruction for obtaining remote host data "http://cookie.sync.com/img/blank.gif."

Next, the browser of the device 12 transmits, to the network information apparatus 10, a request for conversion of the remote host name into an IP address (a DNS inquiry) (S209).

More specifically, first, the browser of the device 12 transmits a DNS request for the IP address of the remote host name "cookie.sync.com" to the network information apparatus 10. The browser of the device 12 obtains the IP address "192.168.0.100" of the information device 11, instead of the IP address of the remote host name "cookie.sync.com," as a DNS response from the network information apparatus 10.

Next, the device 12 assumes that it has obtained the IP address of the remote host name "cookie.sync.com" and attempts to access the obtained IP address to obtain www data (in this case, data on the image tag) (S210).

More specifically, the browser of the device 12 assumes that it has obtained the IP address of the remote host name "cookie.sync.com," accesses the IP address of the information device 11, and requests for the WWW data (in this case, the data on the image tag). In the present embodiment, the browser of the device 12 accesses "http://192.168.0.100/img/blank.gif" and requests for the WWW data.

The information device 11 then generates a redirect instruction, instead of the WWW data, as a response (S211), and responds by transmitting, to the browser of the device 12, a response including the device ID of the information device 11 (specific information) and information for instructing the device 12 to connect to the predetermined redirect destination (the predetermined redirect URL).

Next, the browser of the device 12 follows the redirect instruction and accesses a website 7 at the redirect destination (the redirect URL) to obtain the WWW data (the data on the image tag) (S210). In the present embodiment, when following the redirect instruction and accessing the redirect destination (the redirect URL), the browser of the device 12 transfers, to the website 7 at the redirect destination, the Cookie ID of the browser of the device 12 (Cookie: adserver_id=yyy) together with data (http://ad.server.com/get/?stb=xxx) including the device ID of the information device 11 (the specific information) and the information on the predetermined redirect destination (the predetermined redirect URL).

Next, the website 7 at the redirect URL obtains the above parameters from the browser of the device 12, and creates and returns response data (for example, a transparent GIF image) (S213).

At the end, in the server that presents the website 7 at the redirect URL, the parameters obtained by the website 7 (stb=xxx, Cookie id=yyy) are linked to each other (S214), and the process ends.

In this way, the information device identification system according to the present embodiment is capable of associating the user of the information device 11 and the user of the device 12 with each other as identical users without requiring users to perform an additional operation such as logging in.

Note that in S208, when the remote host name designated by "Cookies sync tag" does not match the specific remote host name held by the remote host holding unit 105 of the network information apparatus 10, the network information apparatus 10 obtains the IP address of the remote host name "cookie.sync.com" as a DNS response.

Furthermore, S209 is an example of the case where the user 2 uses the device 12 within the same local network (LAN) as the network information apparatus 10. In the case where the user 2 uses the device 12 within a network different from the network within which the network information apparatus 10 is located (for example, on the Internet outside home), the browser of the device 12 sends a DNS inquiry to, instead of the network information apparatus 10, a DNS server on the Internet. An example of this case will be described below with reference to FIG. 10.

Figure 10:
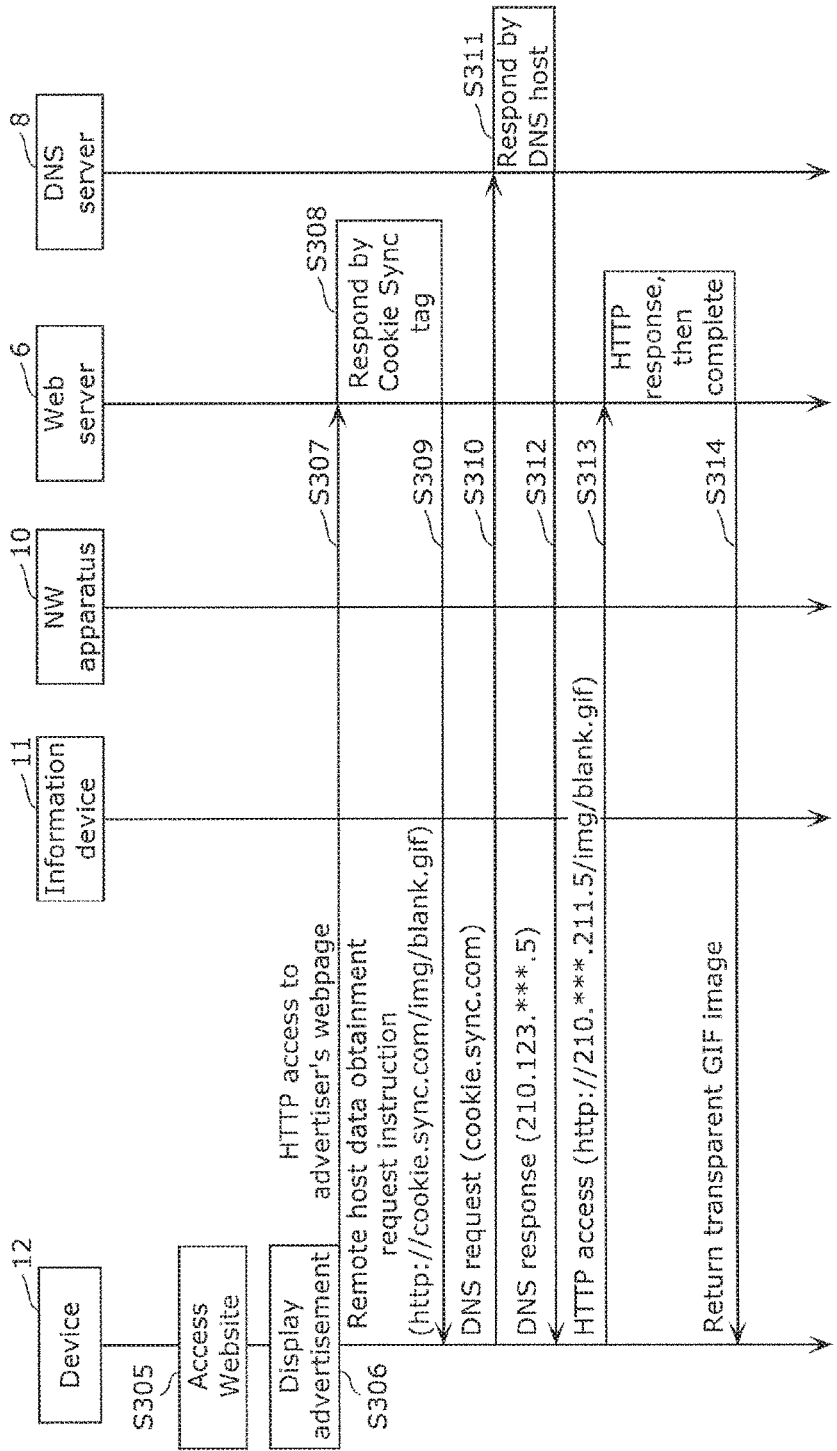
FIG. 10 illustrates an example of a communication sequence of an information device identification system according to Embodiment 1.

FIG. 10 illustrates an example of the communication sequence of the information device identification system according to Embodiment 1.

First, the user 2 accesses a website using, for example, the browser of the device 12 (S305).

The browser of the device 12 then displays an advertisement presented in an advertisement frame on the website, together with the accessed website (S306).

In the present embodiment, the browser of the device 12 accesses the web server 6 via the network information apparatus 10 and displays the advertisement presented in the advertisement frame on the website. In this advertisement frame, the Cookies sync tag is embedded.

Furthermore, when displaying the advertisement presented in the advertisement frame of the website, the browser of the device 12 accesses "Cookies sync tag" embedded in the advertisement frame (S307). The browser of the device 12 then receives the remote host data obtainment request instruction (S309) as a response from "Cookies sync tag," that is, as a response of the instruction for displaying the image tag designated by "Cookies sync tag" (S308). In the present embodiment, the browser of the device 12 receives an instruction for obtaining the remote host data "http://cookie.sync.com/img/blank.gif."

Next, the browser of the device 12 transmits, to a DNS server 8, the request for conversion of the remote host name into an IP address (the DNS inquiry). More specifically, first, the browser of the device 12 transmits the DNS request for the IP address of the remote host name "cookie.sync.com" to the DNS server 8 (S310). The DNS server 8 then searches for the IP address based on the host name and responds (S311). The browser of the device 12 obtains, from the DNS server 8, the IP address, for example, "210.***.211.5" of the remote host name "cookie.sync.com" as the DNS response (S312).

Next, the device 12 accesses the IP address "210.*.211.5" of the remote host name "cookie.sync.com" using HTTP (http://210.*.211.5/img/blank.gif) (S313) and obtains the WWW data (in this case, the data on the image tag) (S314).

[Advantageous Effects, Etc.]

Figure 11:
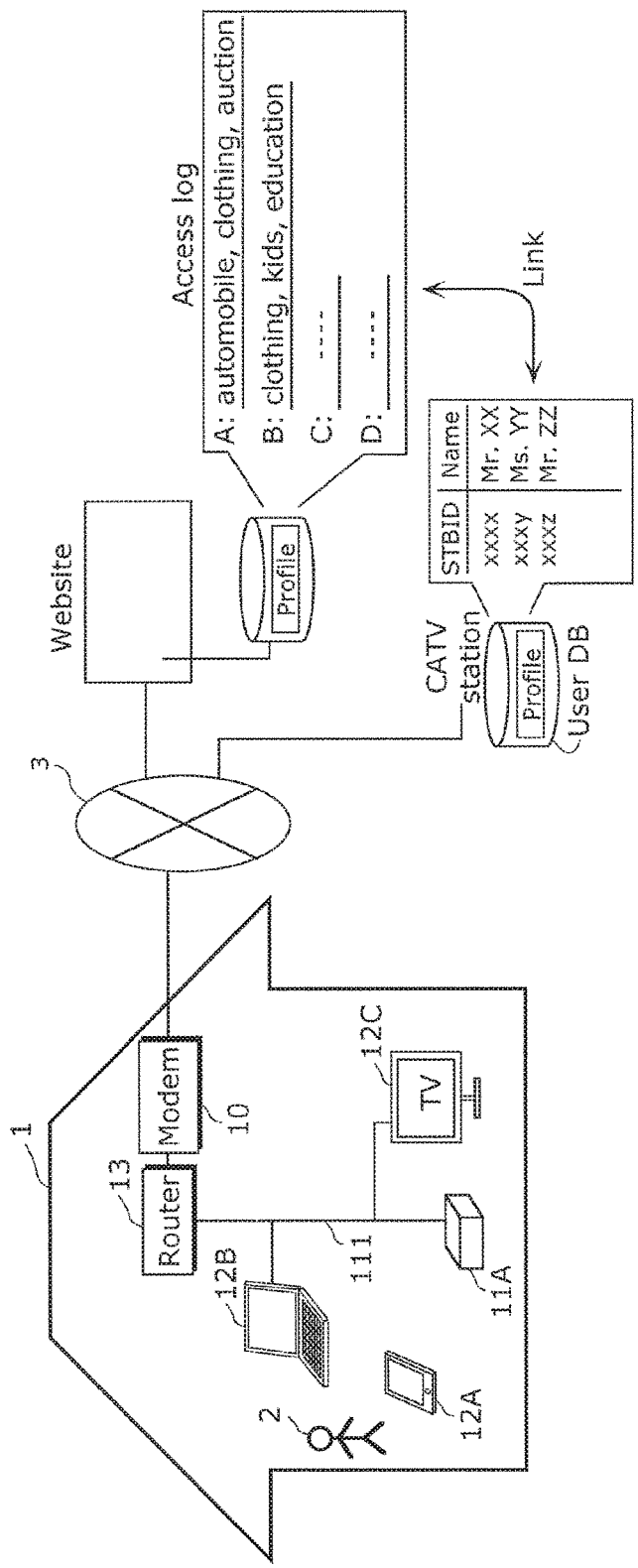
FIG. 11 conceptually illustrates an advantageous effect produced by a device identification system according to Embodiment 1.

FIG. 11 conceptually illustrates an advantageous effect produced by the device identification system according to Embodiment 1.

According to the present embodiment, as illustrated in FIG. 11, for example, the user 2 who is using the device 12, such as the smartphone 12A, the PC 12B, or the TV 12C, and, for example, the user 2 who is using the information device 11, such as the STB 11A, can be linked to (associated with) each other. This association can be achieved by users merely performing the operations which the users usually perform, such as accessing a website and watching a program on the information device 11, without requiring the users to perform an additional operation such as logging in, as described above.

Note that in the example illustrated in FIG. 11, the access log of the user 2 who uses the device 12, such as the smartphone 12A, the PC 12B, or the TV 12C, and, for example, the user information of the user 2 who uses the information device 11, such as the STB 11A, are linked to each other. The access log illustrated in FIG. 11 shows pages about automobile, clothing, and auction in category A, pages about clothing, kids, and education in category B, etc., of the websites accessed by the user 2. In the user information, the name of the user 2 and the specific information on the information device 11 such as the STB 11A (STBID) are registered.

Note that the network information apparatus 10 includes the DNS spooler 101, the remote host holding unit 105, the information device IP address holding unit 106, the obtaining unit 107, the communication unit 108, and the response determining unit 109 in the present embodiment, but is not limited to this configuration. The network information apparatus 10 that includes at least the DNS spooler 101 and the remote host holding unit 105 can produce the advantageous effects of the present embodiment. Likewise, the information device 11 includes the device ID responding unit 111, the information device ID holding unit 112, the redirect URL holding unit 113, and the communication unit 114 in the present embodiment, but is not limited to this configuration. The information device 11 that includes at least the device ID responding unit 111 can produce the advantageous effects of the present embodiment. Furthermore, the DNS spooler 101, the remote host holding unit 105, and the device ID responding unit 111 are included in the network information apparatus and the information device 11 in the present embodiment, but are not limited to this arrangement; it is sufficient that they be included in the information device identification system.

Thus, the information device identification system according to the present embodiment includes: a remote host holding unit configured to hold a specific remote host name indicating a predetermined remote host; a receiving unit configured to receive an inquiry about an internet protocol (IP) address corresponding to one remote host name indicating one remote host, the IP address being used by a device to connect to the one remote host; a determining unit configured to determine whether or not the one remote host name received by the receiving unit matches the specific remote host name held by the remote host holding unit; an IP address responding unit configured to respond by transmitting, to the device, an IP address of an information device instead of the IP address indicating the one remote host when the determining unit determines that the one remote host name matches the specific remote host name; and a device ID responding unit configured to, when the device is caused to send a request for data to the one remote host using the IP address of the information device transmitted by the IP address responding unit, respond by transmitting, to the device, data including information for instructing the device to connect to a predetermined redirect destination and specific information (device ID) for uniquely identifying the information device.

The above information device identification system may further include: a network information apparatus; and the information device. The network information apparatus may include the remote host holding unit, the receiving unit, the determining unit, and the IP address responding unit, and the information device may include the device ID responding unit.

Furthermore, the above information device identification system may further include a response determining unit configured to determine whether or not the device ID responding unit is ready to respond. The response determining unit may be configured to transmit, to a domain name system (DNS) server external to the information device identification system, the inquiry about the IP address corresponding to the one remote host name when the response determining unit determines that the device ID responding unit is not ready to respond.

Furthermore, the above information device identification system may further include a remote host obtaining unit configured to obtain the specific remote host name.

Furthermore, the above information device identification system may further include: an IP address obtaining unit configured to obtain the IP address of the information device; and an information device IP address holding unit configured to hold the IP address of the information device obtained by the IP address obtaining unit.

The information device identification method according to the present embodiment includes: holding a specific remote host name indicating a predetermined remote host; receiving an inquiry about an internet protocol (IP) address corresponding to one remote host name indicating one remote host, the IP address being used by a device to connect to the one remote host; determining whether or not the one remote host name received in the receiving matches the specific remote host name held in the holding; responding by transmitting, to the device, an IP address of an information device instead of the IP address indicating the one remote host when the one remote host name is determined to match the specific remote host name in the determining; and causing the device to send a request for data to the one remote host using the IP address of the information device transmitted in the responding, and responding by transmitting, to the device, data including information for instructing the device to connect to a predetermined redirect destination and specific information (device ID) for uniquely identifying the information device.

The program for causing a computer to execute the information device identification method according to the present embodiment is a program for causing the computer to execute the steps of: holding a specific remote host name indicating a predetermined remote host; receiving an inquiry about an internet protocol (IP) address corresponding to one remote host name indicating one remote host, the IP address being used by a device to connect to the one remote host; determining whether or not the one remote host name received in the receiving matches the specific remote host name held in the holding; responding by transmitting, to the device, an IP address of an information device instead of the IP address indicating the one remote host when the one remote host name is determined to match the specific remote host name in the determining; and causing the device to send a request for data to the one remote host using the IP address of the information device transmitted in the responding, and responding by transmitting, to the device, data including information for instructing the device to connect to a predetermined redirect destination and specific information (device ID) for uniquely identifying the information device.

The information device according to the present embodiment is an information device connected to a network information apparatus (a cable modem, a router) and belonging to the same local area network as the network information apparatus. The information device includes a device ID responding unit configured to respond by transmitting, to a device that sent a request for data using an internet protocol (IP) address of the information device instead of an IP address indicating one remote host, data including information for instructing the device to connect to a predetermined redirect destination and specific information (device ID) for uniquely identifying the information device, the device being a device belonging to the local area network and that sends the request for data to the one remote host.

The functions of the information device according to the present embodiment may be implemented through a program for causing a computer to execute the functions. Specifically, it is possible to provide a program for causing an information device to respond, the information device being connected to a network information apparatus (a cable modem, a router) and belonging to the same local area network as the network information apparatus. The program may cause the computer to respond by transmitting, to a device that sent a request for data using an internet protocol (IP) address of the information device instead of an IP address indicating one remote host, data including information for instructing the device to connect to a predetermined redirect destination and specific information (device ID) for uniquely identifying the information device, the device being a device belonging to the local area network and that sends the request for data to the one remote host.

With this, a user who uses the information device 11 and a user who uses the device 12 can be associated with each other as identical users while the user uses the device 12 in an ordinary way, without requiring the user to perform an addition operation.

As described above, according to the present embodiment, it is possible to provide an information device identification system, an information device identification method, an information device, and a program which can associate identical users with each other without requiring users to perform an additional operation such as logging in.

Embodiment 2

Although Embodiment 1 describes the network information apparatus 10 that includes the DNS spooler 101 and the remote host holding unit 105, this is not the only example. The network information apparatus need not include the DNS spooler or the remote host holding unit. Embodiment 2 will describe an example of this case.

Hereinafter, description will not be repeated for points substantially the same as those in Embodiment 1; Embodiment 2 will be described focusing on points of difference from Embodiment 1.

[Overall Configuration]

Figure 12:
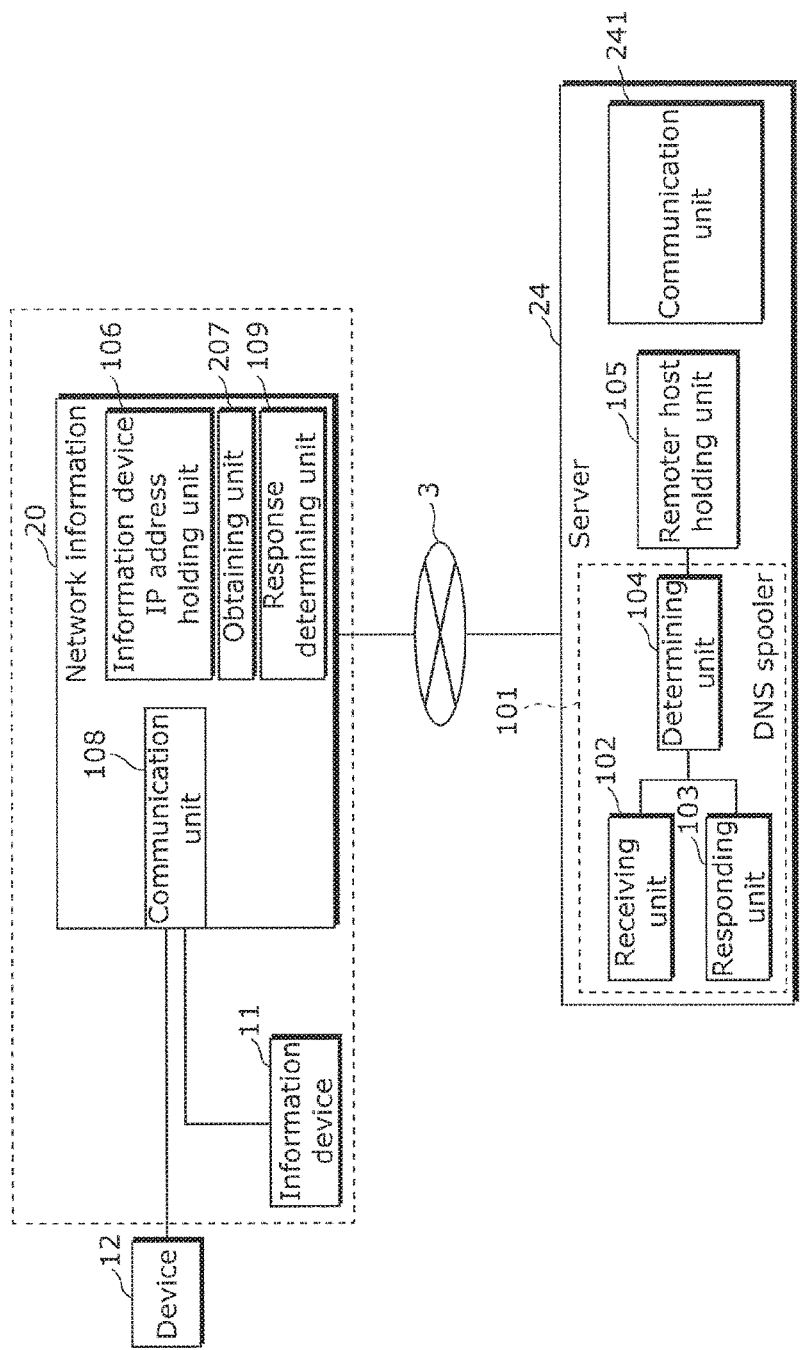
FIG. 12 illustrates an example of a configuration of an information device identification system according to Embodiment 2.

FIG. 12 illustrates an example of the configuration of an information device identification system according to Embodiment 2. Note that the same numerical reference is given to elements that are substantially the same as those in FIG. 4, FIG. 5, and FIG. 7, and detailed description thereof will be omitted.

The information device identification system according to Embodiment 2, illustrated in FIG. 12, includes an information device 11 and a network information apparatus 20 enclosed by the dotted line. Furthermore, in FIG. 12, the device 12 and a server 24 are connected to the information device identification system according to Embodiment 2. The server 24 is connected to the information device identification system according to Embodiment 2 via the Internet 3 or the like.

The configuration of the network information apparatus 20 according to the present embodiment is different from the configuration of the network information apparatus 10 according to Embodiment 1. More specifically, as compared to the network information apparatus 10 according to Embodiment 1, the network information apparatus 20 does not include the DNS spooler or the remote host holding unit and is different in the function of the obtaining unit, that is, the network information apparatus 20 includes an obtaining unit 207.

The obtaining unit 207 includes the IP address obtaining unit 1072 only among the remote host obtaining unit 1071 and the IP address obtaining unit 1072 illustrated in FIG. 6. The function of the IP address obtaining unit 1072 is the same as described in Embodiment 1, and description thereof will not be repeated.

The server 24 belongs to a wide area network (WAN) different from the network to which the network information apparatus 20 belongs and is connected to the network information apparatus 20 via the Internet 3.

As illustrated in FIG. 12, the server 24 includes the DNS spooler 101, the remote host holding unit 105, and a communication unit 241. The functions of the DNS spooler 101 and the remote host holding unit 105 are the same as described in Embodiment 1, and description thereof will not be repeated here.

The communication unit 241 communicates with the network information apparatus 20 via a network external to the home 1, such as the Internet 3. Furthermore, the communication unit 241 obtains a specific remote host name indicating a predetermined remote host via the Internet 3. This means that the communication unit 241 has the function of the remote host obtaining unit 1071 according to Embodiment 1.

[Advantageous Effects, Etc.]

As described above, according to the present embodiment, it is possible to provide an information device identification system, an information device identification method, an information device, and a program which can associate identical users with each other without requiring users to perform an additional operation such as logging in.

Embodiment 3

Embodiment 2 described the case where the network information apparatus 20 does not include the DNS spooler 101 or the remote holding unit 105 and the function of the DNS spooler 101 included in the server 24 belonging to an external network is used instead.

Embodiment 3 describes the case where the function of the DNS spooler 101 is included in a device which the user 2 uses. Hereinafter, description will not be repeated for points substantially the same as those in Embodiment 1 and Embodiment 2; Embodiment 3 will be described focusing on points of difference from Embodiment 1 and Embodiment 2.

[Overall Configuration]

Figure 13:
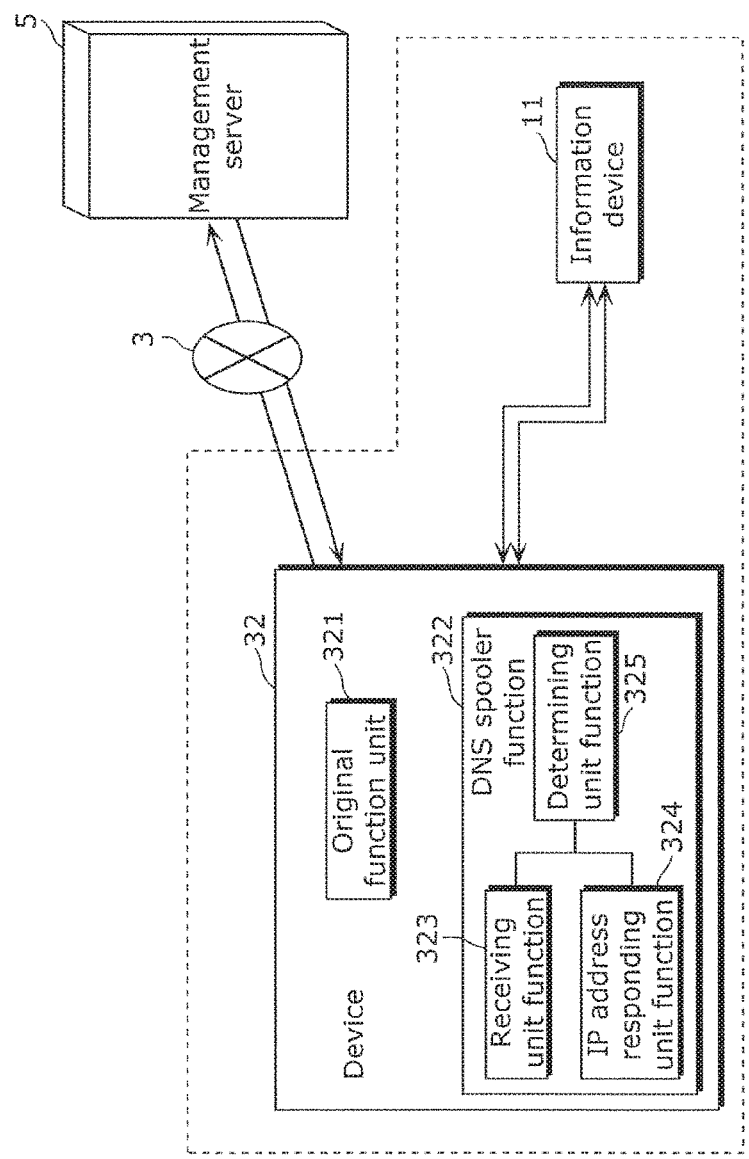
FIG. 13 illustrates an example of a configuration of an information device identification system according to Embodiment 3.

FIG. 13 illustrates an example of the configuration of an information device identification system according to Embodiment 3. Note that the same numerical reference is given to elements that are substantially the same as those in FIG. 4, FIG. 5, and FIG. 7, and detailed description thereof will be omitted. The information device identification system illustrated in FIG. 13 includes the information device 11 and a device 32 enclosed by the dotted line. FIG. 13 shows an example of the information device identification system according to Embodiment 3 where the device 32 is connected to the management server 5 via the Internet 3 or the like. In other words, the information device identification system illustrated in FIG. 13 does not include the network information apparatus 10; FIG. 13 shows an example of a case where the function of the network information device 10 is achieved by the device 32.

[Configuration of Device]

The configuration of the device 32 will be described below.

The device 32 illustrated in FIG. 13 is different from the device 12 according to Embodiment 1 in that the device 32 includes a DNS spooler function.

The device 32 illustrated in FIG. 13 includes a DNS spooler function 322 and an original function unit 321 which fulfills the original functions of the device 32 including a function of accessing a website and a communication function.

The DNS spooler function 322 includes a receiving unit function 323, an IP address responding unit function 324, and a determining unit function 325.

The receiving unit function 323, the IP address responding unit function 324, and the determining unit function 325 are function units that fulfill the respective functions corresponding to the receiving unit 102, the IP address responding unit 103, and the determining unit 104 according to Embodiment 1. Note that the respective functions corresponding to the receiving unit 102, the IP address responding unit 103, and the determining unit 104 are the same as described in Embodiment 1, and description thereof will not be repeated.

The DNS spooler function 322 configured as described may be executed with software (a program) installed on the device 32. This case will be described below as Example.

Example

Figure 14:
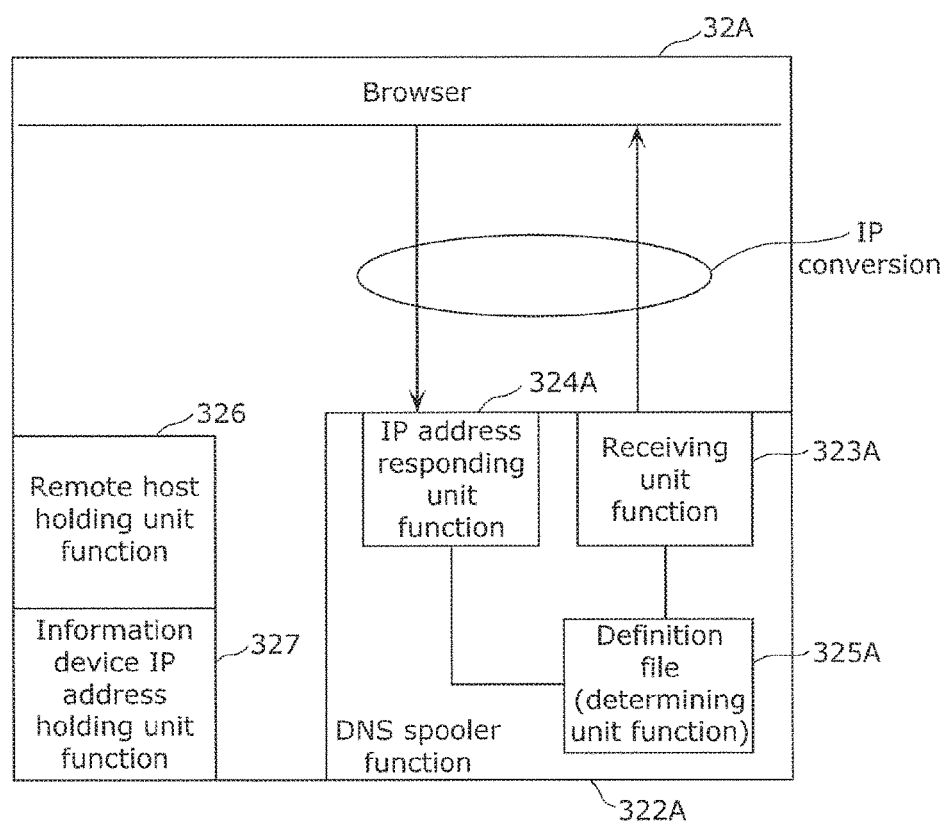
FIG. 14 illustrates an example of a configuration according to Embodiment 3 in which a domain name system (DNS) spooler function is executed with software.

FIG. 14 illustrates an example of the configuration according to Embodiment 3 in which the DNS spooler function is executed with software. In the following description, it is assumed that the device 32 is a device such as a personal computer (PC).

The software on the device 32 illustrated in FIG. 14 includes a DNS spooler function 322A, a remote host holding unit function 326, and an information device IP address holding unit function 327.

The remote host holding unit function 326 and the information device IP address holding unit function 327 are function units that fulfill the respective functions corresponding to the remote host holding unit 105 and the information device IP address holding unit 106 according to Embodiment 1. Here, the remote host holding unit function 326 and the information device IP address holding unit function 327 can be provided through the installation of software on a PC 32A (the device 32).

Note that the respective functions corresponding to the remote host holding unit 105 and the information device IP address holding unit 106 are the same as described in Embodiment 1, and description thereof will not be repeated.

The DNS spooler function 322A includes a receiving unit function 323A, an IP address responding unit function 324A, and a definition file 325A. Note that the DNS spooler function 322A operates in substantially the same way as the DNS spooler 101 described in Embodiment 1. Example will be described focusing on points of difference from Embodiment 1.

The DNS spooler function 322A can be provided by the use of the basic functions of the operating system (OS) of the PC 32A (the device 32).

The receiving unit function 323A receives an inquiry about the IP address which corresponds to the one remote host name indicating one remote host and is used by a browser of the PC 32A (the device 32) to connect to the one remote host. The IP address responding unit function 324 responds by transmitting, to the browser of the PC 32A (the device 32), the IP address of the information device 11 instead of the IP address indicating the one remote host when the one remote host name matches the specific remote host name in the definition file 325A.

The basic functions of the OS of the PC 32A (the device 32) include an IP conversion function; the receiving unit function 323A and the IP address responding unit function 324A can be implemented using the basic functions of the OS of the PC 32A (the device 32).

In contrast, the definition file 325A corresponding to the determining unit function 325 cannot be implemented using only the basic functions of the OS. The definition file is included in the basic functions of the OS of the PC 32A (the device 32) and describes a host definition file (a table file) and a DNS.

In Example, software, such as a patch file, is installed on the OS of the PC 32A (the device 32), and the basic functions of the OS are used to write, into the host definition file (the table file for determination) of the definition file 325A, the specific remote host name and the IP address of the information device 11 held by the remote host holding unit function 326 and the information device IP address holding unit function 327.

This allows the IP address responding unit function 324A to refer to the definition file 325A, and when one remote host name matches the specific remote host name described in the host definition file, respond by transmitting, to the device 32, the IP address of the information device 11 instead of the IP address indicating the one remote host.

[Advantageous Effects, Etc.]

According to the present embodiment, the device 32 is capable of associating a user who uses the information device 11 and a user who uses the browser of the device 32 with each other as identical users while the user uses the browser of the device 32 in an ordinary way, without requiring the user to perform an addition operation.

Specifically, the information device identification system according to the present embodiment includes the device, and the device in the information device identification system includes the receiving unit, the determining unit, and the IP address responding unit.

With this configuration, it is possible to associate identical users with each other without requiring users to perform an additional operation such as logging in.

As described above, according to the present embodiment, it is possible to provide an information device identification system, an information device identification method, an information device, and a program which can associate identical users with each other without requiring users to perform an additional operation such as logging in.

Embodiment 4

Embodiment 4 describes the case where a device 42 includes, instead of the function of the DNS spooler, the function of the device ID responding unit or the like included in the information device 11. Hereinafter, description will not be repeated for points substantially the same as those in Embodiment 1 to Embodiment 3; Embodiment 4 will be described focusing on points of difference from Embodiment 1 to Embodiment 3.

Figure 15:
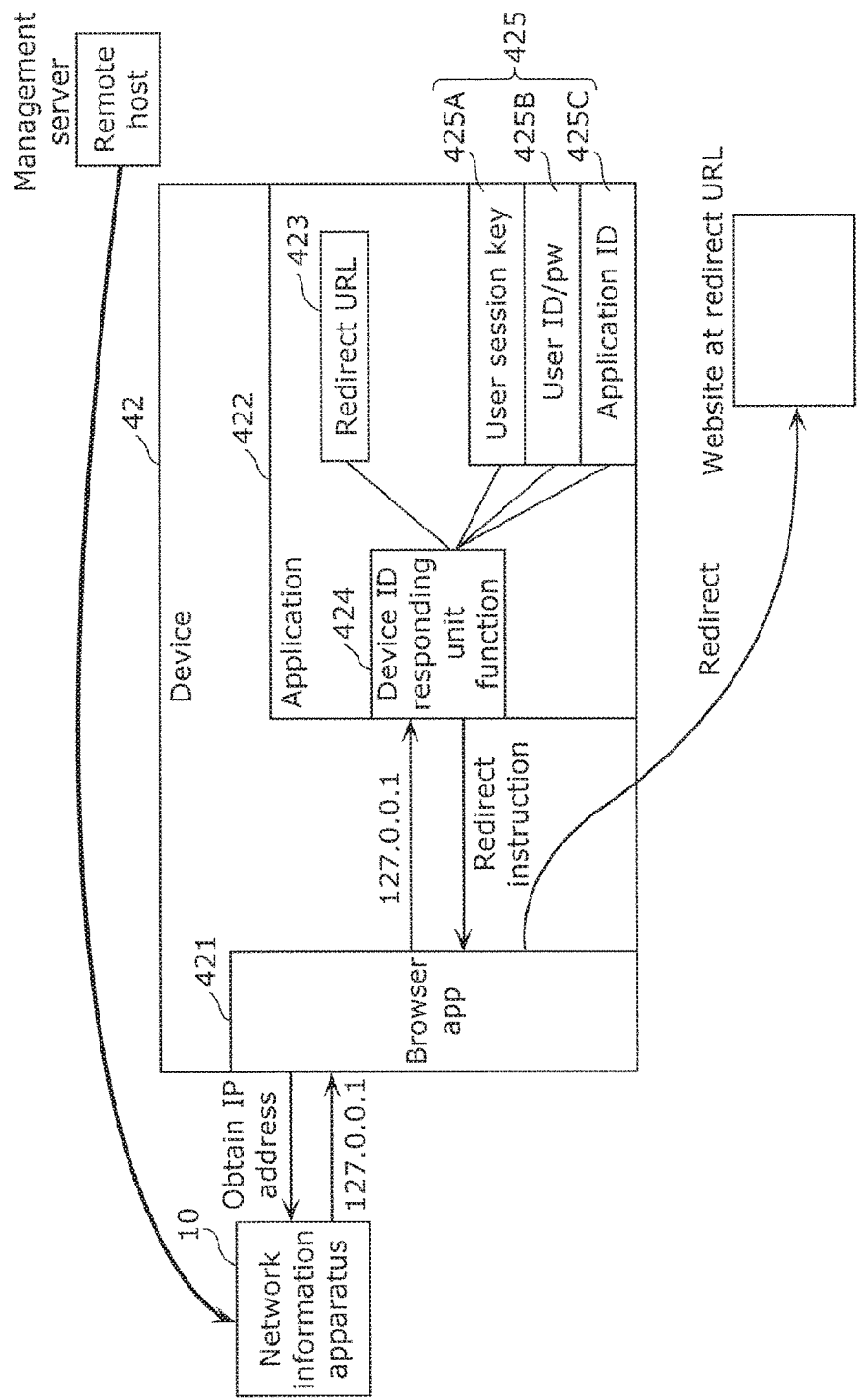
FIG. 15 illustrates an example of a configuration of an information device identification system according to Embodiment 4.

FIG. 15 illustrates an example of the configuration of an information device identification system according to Embodiment 4. Note that the same numerical reference is given to elements that are substantially the same as those in FIG. 4, FIG. 5, and FIG. 7, and detailed description thereof will be omitted. The information device identification system exemplified in FIG. 15 does not include the information device 11, such as the STB 11A, and provides the function of the information device 11 by the device 42.

[Configuration of Device]

In the present embodiment, the device 42 is a device on which a user can freely install and add an application, such as a smartphone. The following will describe an example of the case where the device 42 provides the function of the information device 11 by an application.

On the device 42 illustrated in FIG. 15, a browser app 421 and an application 422 are installed.

The browser app 421 is an application serving as the browser described in Embodiment 1, etc.; when this browser app 421 runs, the user 2 can use the browser of the device 42.

The application 422 is an application different from the browser app 421. The application 422 is software that provides the function of the device ID responding unit or the like included in the information device 11.

The application 422 is an application that is to be used for a specific purpose. The application 422 includes a device ID responding unit function 424 and holds a redirect URL 423, a user session key 425A, a user ID/pw 425B, and an application ID 425C.

Specifically, the device ID responding unit function 424 is a function unit that fulfils the function of the device ID responding unit 111 in Embodiment 1. Details of this function are the same as described in Embodiment 1, and description thereof will not be repeated.

The redirect URL 423 corresponds to the redirect URL held by the redirect URL holding unit 113 in Embodiment 1 and is held by the application 422.

The application ID 425C corresponds to the information device ID held by the information device ID holding unit 112 in Embodiment 1. Note that the user ID/pw 425B is merely an example; it is sufficient that the user ID/pw 425B be information for identifying a user. Information including the user session key 425A, the user ID/pw 425B, and the application ID 425C may correspond to the information device ID held by the information device ID holding unit 112 in Embodiment 1.

In this case, when the determining unit 104 determines that one remote host name (the host name obtained from the management server) matches the specific remote host name, the IP address responding unit 103 of the network information apparatus 10 responds by transmitting, to the browser app 421 of the device 42, the IP address (127.0.0.1) that serves as an instruction for accessing the application 422, instead of the IP address indicating one remote host.

When the browser app 421 is caused to send a request for data to the one remote host using the IP address (127.0.0.1) transmitted by the IP address responding unit 103 of the network information apparatus 10, the device ID responding unit function 424 responds by transmitting, to the browser app 421, information including information for instructing the browser app 421 to connect to a predetermined redirect destination (the redirect URL 423), specific information for uniquely identifying the application 422 (the application ID 425C), and information including the user session key 425A and the user ID/pw 425B.

[Advantageous Effects, Etc.]

In the present embodiment, it is assumed that the device 12 and the information device 11 in Embodiment 1 correspond to the browser app 421 and the application 422, respectively, of the device 42. This is because different applications in the device 42, such as a smartphone, operate independently; thus, such correspondence is possible.

In other words, in the device 42, what corresponds to the specific information for identifying the information device 11 may be the ID of the application 422 (the application ID 425C) of the device itself (the device 42). In this case, the device 42 includes: the browser app 421 which accesses a website via the network information apparatus 10 located within the same network by using the local IP address; and the device ID responding unit function 424 of the application 422 which converts the application ID 425C and the redirect URL 423 of the application 422 and responds by transmitting the result of the conversion to the browser app 421 (WWW response).

With this, a user of the device 42 can associate a user of the application 422 installed on the device 42 and a user who uses the browser app 421 of the device 42 with each other as identical users while the user uses the browser app 421 of the device 42 in an ordinary way, without performing an addition operation.

Thus, according to the present embodiment, it is possible to provide an information device identification system, an information device identification method, an information device, and a program which can associate identical users with each other without requiring users to perform an additional operation.

Other Embodiments

Hereinbefore, Embodiments 1 to 4 are described as exemplifications of the technique according to the present disclosure. The accompanying drawings and detailed description are provided for this purpose.

Therefore, the structural elements described in the accompanying drawings and the detailed description include, not only structural elements essential to solving the problem, but also structural elements that are not essential to solving the problem but are included in order to exemplify the aforementioned technique. As such, description of these non-essential structural elements in the accompanying drawings and detailed description should not be taken to mean that these non-essential structural elements are essential.

Furthermore, since the foregoing embodiments are for exemplifying the technique according to the present disclosure, various changes, substitutions, additions, omissions, and so on, can be carried out within the scope of the Claims or its equivalents. This means that the technique according to the present disclosure is not limited to the foregoing embodiments, and can also be applied to embodiments to which a change, substitution, addition, omission, or the like is executed as necessary. Furthermore, a new embodiment can be formed by combining the respective structural elements described in Embodiments 1 to 3 described above.

Furthermore, such cases as described below are included in the present disclosure.

For example, although it is described in Embodiments 1 to 4 that the information device, the network information apparatus, and the device are present in the same network segment, this is not the only example. An example of this case will be described below with reference to the drawings.

Figure 16:
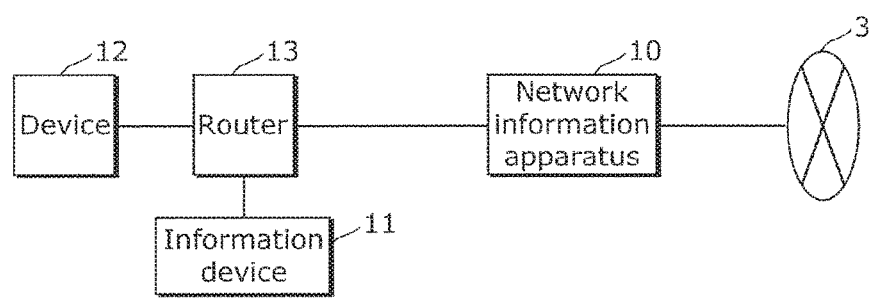
FIG. 16 illustrates an example of a case where an information device, a network information apparatus, and a device according to the present disclosure are present in the same network segment.
Figure 17:
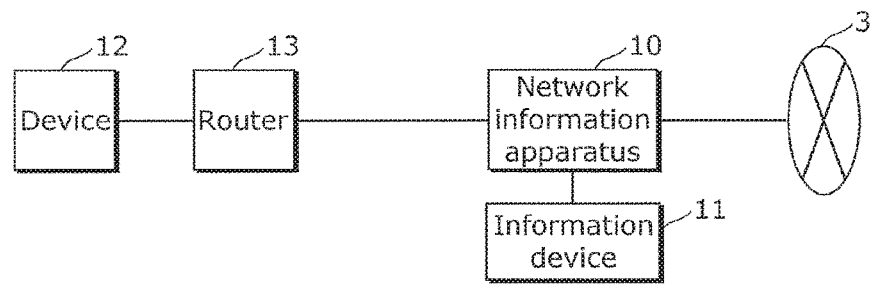
FIG. 17 illustrates an example of a case where an information device, a network information apparatus, and a device according to the present disclosure are present in different network segments.
Figure 18:
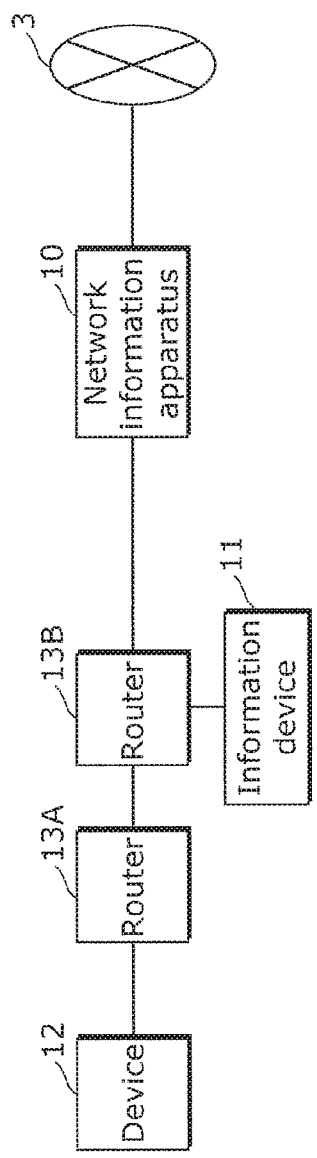
FIG. 18 illustrates an example of a case where an information device, a network information apparatus, and a device according to the present disclosure are present in different network segments.

FIG. 16 illustrates an example of the case where the information device, the network information apparatus, and the device are present in the same network segment. FIG. 17 and FIG. 18 illustrate an example of the case where the information device, the network information apparatus, and the device are present in different network segments.

FIG. 16 corresponds to the arrangement patterns described in Embodiment 1 to 4 and illustrates the case where the device 12 and the information device 11 are connected to and controlled by the same router 13. In other words, FIG. 16 illustrates the case where the information device 11 and the device 12 are physically or virtually connected to the same network segment and controlled by the router 13.

In contrast, FIG. 17 illustrates the case where the information device 11 and the device 12 are physically or virtually connected to different network segments via the router 13. Even in this case, the information device 11 is capable of receiving an access request (including a data obtainment request or the like) from the device 12 when the router 13 is set to have predetermined settings. Therefore, this case is also included in the present disclosure.

FIG. 18 illustrates the case where the information device 11 and the device 12 are physically or virtually connected to different network segments via routers in multiple stages, i.e., a router 13A and a router 13B. Even in this case, the information device 11 is capable of receiving an access request (including a data obtainment request or the like) from the device 12 when the router 13 is set to have predetermined settings. Therefore, this case is also included in the present disclosure.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable as an information device identification system, an information device identification method, an information device, and a program, and is particularly applicable as an information device identification system, an information device identification method, an information device, and a program that associate users using different media without requiring users to perform an additional operation.

The invention claimed is:

1. An information device identification system, comprising a network information apparatus and an information device,
wherein the network information apparatus is configured to:
hold a specific remote host name indicating a predetermined remote host;
receive an inquiry about an internet protocol (IP) address corresponding to one remote host name indicating one remote host, the IP address being used by a device to connect to the one remote host;
determine whether or not the one remote host name received by the network information apparatus matches the specific remote host name held by the network information apparatus; and
respond by transmitting, to the device, an IP address of an information device instead of the IP address indicating the one remote host when the network information apparatus determines that the one remote host name matches the specific remote host name, and
wherein the information device is configured to, when the device is caused to send a request for data to the one remote host using the IP address of the information device transmitted by the network information apparatus, respond by transmitting, to the device, data including information for instructing the device to connect to a predetermined redirect destination and specific information for uniquely identifying the information device.

2. The information device identification system according to claim 1, wherein the network information apparatus is further configured to determine whether or not the information device is ready to respond,
wherein the network information apparatus is configured to transmit, to a domain name system (DNS) server external to the information device identification system, the inquiry about the IP address corresponding to the one remote host name when the network information apparatus determines that the information device is not ready to respond.

3. The information device identification system according to claim 1, wherein the network information apparatus is further configured to obtain the specific remote host name.

4. The information device identification system according to claim 1, wherein the network information apparatus is further configured to obtain the IP address of the information device, and to hold the IP address of the information device.

5. An information device identification system, comprising a device and an information device,
wherein the device is configured to:
hold a specific remote host name indicating a predetermined remote host;
receive an inquiry about an internet protocol (IP) address corresponding to one remote host name indicating one remote host, the IP address being used by the device to connect to the one remote host;
determine whether or not the one remote host name received by the device matches the specific remote host name held by the device; and
respond by transmitting, to the device, an IP address of an information device instead of the IP address indicating the one remote host when the device determines that the one remote host name matches the specific remote host name, and
wherein the information device is configured to, when the device is caused to send a request for data to the one remote host using the IP address of the information device transmitted by the device, respond by transmitting, to the device, data including information for instructing the device to connect to a predetermined redirect destination and specific information for uniquely identifying the information device.

6. An information device identification method, comprising:
holding a specific remote host name indicating a predetermined remote host;
receiving an inquiry about an internet protocol (IP) address corresponding to one remote host name indicating one remote host, the IP address being used by a device to connect to the one remote host;
determining whether or not the one remote host name received in the receiving matches the specific remote host name held in the holding;
responding by transmitting, to the device, an IP address of an information device instead of the IP address indicating the one remote host when the one remote host name is determined to match the specific remote host name in the determining; and
causing the device to send a request for data to the one remote host using the IP address of the information device transmitted in the responding, and responding by transmitting, to the device, data including information for instructing the device to connect to a predetermined redirect destination and specific information for uniquely identifying the information device.

7. A non-transitory computer-readable recording medium for use in a computer, the recording medium storing a program for causing the computer to execute the information device identification method according to claim 6.

8. An information device connected to a network information apparatus and belonging to the same local area network as the network information apparatus, the information device configured to respond by transmitting, to a device that sent a request for data using an internet protocol (IP) address of the information device instead of an IP address indicating one remote host, data including information for instructing the device to connect to a predetermined redirect destination and specific information for uniquely identifying the information device, the device being a device belonging to the local area network and that sends the request for data to the one remote host.

9. A non-transitory computer-readable recording medium for use in a computer, the recording medium storing a program for causing an information device to respond, the information device being connected to a network information apparatus and belonging to the same local area network as the network information apparatus, the program causing the computer to respond by transmitting, to a device that sent a request for data using an internet protocol (IP) address of the information device instead of an IP address indicating one remote host, data including information for instructing the device to connect to a predetermined redirect destination and specific information for uniquely identifying the information device, the device being a device belonging to the local area network and that sends the request for data to the one remote host.

* * * * *